(12) United States Patent
Zhao et al.

(10) Patent No.: US 7,711,729 B2
(45) Date of Patent: May 4, 2010

(54) SEARCHING A DOCUMENT BASED ON A CUSTOMER DEFINED METADATA SCHEMATA

(75) Inventors: Lei Zhao, Sammamish, WA (US); Prakash Sundra Krishnamoorthy, Redmond, WA (US); Richard Critchlow, Seattle, WA (US); Lijiang Fang, Bellevue, WA (US)

(73) Assignee: Microsoft Corporation, Redmond, WA (US)

( * ) Notice: Subject to any disclaimer, the term of this patent is extended or adjusted under 35 U.S.C. 154(b) by 364 days.

(21) Appl. No.: 11/745,166

(22) Filed: May 7, 2007

(65) Prior Publication Data
US 2008/0281781 A1 Nov. 13, 2008

(51) Int. Cl.
*G06F 7/00* (2006.01)
(52) U.S. Cl. .................................................. 707/715
(58) Field of Classification Search ................ 707/715
See application file for complete search history.

(56) References Cited

U.S. PATENT DOCUMENTS

| | | | | |
|---|---|---|---|---|
| 4,233,661 A * | 11/1980 | Bolton et al. | ................. | 705/30 |
| 4,654,793 A * | 3/1987 | Elrod | ............................ | 705/1 |
| 4,806,743 A * | 2/1989 | Thenery | ............... | 235/462.45 |
| 6,041,325 A * | 3/2000 | Shah et al. | ..................... | 707/10 |
| 6,078,928 A * | 6/2000 | Schnase et al. | .......... | 707/104.1 |
| 6,243,451 B1 * | 6/2001 | Shah et al. | ............. | 379/201.03 |
| 6,446,092 B1 * | 9/2002 | Sutter | ........................ | 707/203 |
| 6,480,835 B1 * | 11/2002 | Light | ............................ | 707/3 |
| 6,546,388 B1 | 4/2003 | Edlund et al. | .................. | 707/5 |
| 6,557,007 B1 * | 4/2003 | Pekowski et al. | ........ | 707/104.1 |
| 6,571,232 B1 * | 5/2003 | Goldberg et al. | ............... | 707/2 |
| 6,847,940 B1 * | 1/2005 | Shelton et al. | ................ | 705/26 |
| 6,850,901 B1 * | 2/2005 | Hunter et al. | ................. | 705/26 |
| 6,865,568 B2 * | 3/2005 | Chau | ............................. | 707/3 |
| 6,910,029 B1 * | 6/2005 | Sundaresan | .................... | 707/2 |
| 7,054,859 B2 * | 5/2006 | Kuno et al. | .................... | 707/5 |
| 7,162,488 B2 | 1/2007 | DeVorchik et al. | .......... | 707/102 |
| 7,181,445 B2 * | 2/2007 | Bebo et al. | ..................... | 707/3 |
| 7,188,107 B2 * | 3/2007 | Moon et al. | .................... | 707/5 |
| 7,266,563 B2 * | 9/2007 | Morris et al. | ............... | 707/102 |
| 7,283,998 B2 * | 10/2007 | Moon et al. | .................... | 707/5 |
| 7,349,913 B2 | 3/2008 | Clark et al. | ................. | 707/101 |
| 2003/0177118 A1 * | 9/2003 | Moon et al. | .................... | 707/5 |

(Continued)

OTHER PUBLICATIONS

Kirayakov, Atanas, et al., "Semantic Annotation, Indexing, and Retrieval," Elsevier's Journal of Web Semantics, http://www.ontotext.com/publications/SemAIR_SWJpdf, 2004, 39 pages.

(Continued)

*Primary Examiner*—Hung Q Pham
*Assistant Examiner*—Hubert Cheung
(74) *Attorney, Agent, or Firm*—Mercahnt & Gould P.C.

(57) ABSTRACT

Search and filtering of documents with different metadata schemata is enabled using a single index that supports a single schema through decorated namespaces. Each metadata schema submitted to a system is assigned a unique identifier and property names associated with the schema are prefixed with the unique identifier. A single-valued, decorated property is used to indicate whether a submitted document is part of a registered schema in the system. The single-valued properties are converted to a search index table that enables resource-optimized searching and filtering of documents eliminating documents of other schemata by simply checking the association property.

9 Claims, 6 Drawing Sheets

U.S. PATENT DOCUMENTS

| | | | |
|---|---|---|---|
| 2004/0078386 A1* | 4/2004 | Moon et al. | 707/102 |
| 2005/0044089 A1 | 2/2005 | Wu | 707/1 |
| 2005/0256867 A1 | 11/2005 | Walther et al. | 707/3 |
| 2008/0016088 A1* | 1/2008 | Liu et al. | 707/100 |
| 2008/0016122 A1* | 1/2008 | Liu et al. | 707/200 |

OTHER PUBLICATIONS

"Publications," Ontotext Semantic Technology Lab, (cited as date of publication source for article "Semantic Annotation, Indexing, and Retrieval," above), http://ontotext.com/publications/, 2008, 7 pages.

Hawking, David R. et al., "Efficient and Flexible Search Using Text and Metadata CSIRO Mathematical and Information Sciences Technical Report 2000/83," May 2000, 13 pages, http://es.csiro.au/pubs/hawking_tr00b.pdf.

Denilson Barbosa, et al., "ToX—The Toronto XML Engine," University of Calgary, paper presented at First International Workshop on Information Integration on the Web, Aug. 21, 2001, http://www.ucalgary.ca/~denilson/docs/wiiw.pdf.

"Articles and Papers. Jul.-Sep. 2001. XML General Articles and Papers; Surveys, Overviews, Presentations, Introductions, Announcements," Cover Pages, Hosted by Oasis, May 28, 2002, pp. 1 and 47 (cited as date of publication source for article "ToX—The Toronto XML Engine," above), http://xml.coverpages.org/xmlPapers2001Q3.html.

* cited by examiner

SEARCHING A DOCUMENT BASED ON A CUSTOMER DEFINED METADATA SCHEMATA

BACKGROUND

Document search in digital libraries, the Internet, and organizational intranets is best served by a combination of metadata processing and content searching. Searchers often rely on content if metadata is absent, erroneous, or incomplete. Metadata-based searches have their own unique challenges. For example, large legacy collections combined with budgets insufficient to permit complete and consistent tagging may mean that metadata associated with the documents of such collections is often limited or non-existent. Furthermore, the wide variety of document types and processing approaches result in non-standardized ways of using metadata to assign properties to documents. Not only may different content generators use different types of properties, but they may use completely different properties (e.g. author, expiration date, version, and so on). On the other extreme end of the spectrum, some or all of the documents may be catalog records consisting entirely of metadata (e.g. in museums, libraries, or repositories).

Often for reasons of economy or practicality, a service platform that provides customers with the service of searching sets of documents that have been annotated with metadata properties may not be able to dictate what schema of metadata the customer should use. In order for the service platform to support multiple customers with a reasonably sized physical implementation, it is desired for the service to be able to combine documents from different customers, and thus with different metadata schemata, in a single search-engine index without loss of data.

SUMMARY

This summary is provided to introduce a selection of concepts in a simplified form that are further described below in the Detailed Description. This summary is not intended to identify key features or essential features of the claimed subject matter, nor is it intended as an aid in determining the scope of the claimed subject matter.

Embodiments are directed to enabling search of documents with different metadata schemata in a single index that supports a single schema through use of namespaces. According to one embodiment, the property names associated with a document may be converted to a decorated version used in the index schema when the documents are indexed. By using multiple single-valued properties whose names indicate which schema the document belongs to, use of multi-valued property may be avoided in filters. A requested set of document schemas may be converted into a filter over the properties of joint tables containing documents of all schemas at query time. Query semantics are defined based on the properties.

These and other features and advantages will be apparent from a reading of the following detailed description and a review of the associated drawings. It is to be understood that both the foregoing general description and the following detailed description are explanatory only and are not restrictive of aspects as claimed.

DETAILED DESCRIPTION

As briefly described above, documents with different metadata schemata may be searched in a single index that supports a single schema through use of namespaces, and filtering over metadata may be accomplished allowing searches to return documents from one or more schemata. In the following detailed description, references are made to the accompanying drawings that form a part hereof, and in which are shown by way of illustrations specific embodiments or examples. These aspects may be combined, other aspects may be utilized, and structural changes may be made without departing from the spirit or scope of the present disclosure. The following detailed description is therefore not to be taken in a limiting sense, and the scope of the present invention is defined by the appended claims and their equivalents.

While the embodiments will be described in the general context of program modules that execute in conjunction with an application program that runs on an operating system on a personal computer, those skilled in the art will recognize that aspects may also be implemented in combination with other program modules.

Generally, program modules include routines, programs, components, data structures, and other types of structures that, perform particular tasks or implement particular abstract data types. Moreover, those skilled in the art will appreciate that embodiments may be practiced with other computer system configurations, including hand-held devices, multiprocessor systems, microprocessor-based or programmable consumer electronics, minicomputers, mainframe computers, and the like. Embodiments may also be practiced in distributed computing environments where tasks are performed by remote processing devices that are linked through a communications network, in a distributed computing environment, program modules may be located in both local, and remote memory storage devices.

Embodiments may be implemented as a computer process (method), a computing system, or as an article of manufacture, such as a computer program product or computer readable media. The computer program product may be a computer storage media readable by a computer system and encoding a computer program of instructions for executing a computer process. The computer program product may also be a propagated signal on a carrier readable by a computing system and encoding a computer program of instructions for executing a computer process.

Figure 1:
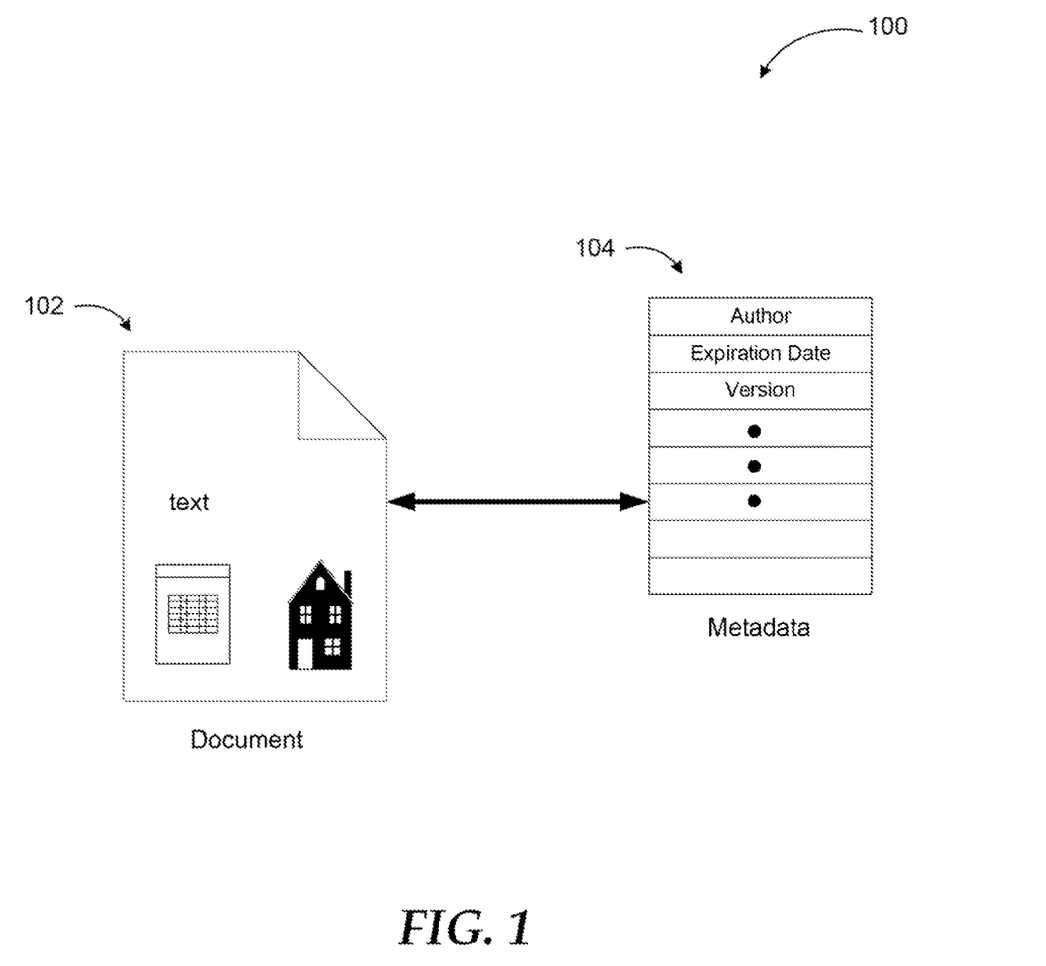
FIG. 1 illustrates an example document and its associated metadata.

Referring to FIG. 1, an example document and its associated metadata are illustrated in diagram 100. The simplest definition of metadata is that it is data about data. An item of metadata may describe an individual data item or a collection of data items. Metadata is used to facilitate the understanding, use and management of data and vary with the type of data and context of use. For example, in the context of a library, where the data is the content of the titles stocked, metadata about a title might typically include a description of the content, the author, the publication date and the physical location. Metadata about a collection of data items, a computer file, might typically include the name of the file, the type of file, and the name of the data administrator.

When structured into a hierarchical arrangement, metadata is more properly called an ontology or schema. Both terms describe "what exists" for some purpose or to enable some action. For example, the arrangement of subject headings in a library catalog serves not only as a guide to finding books on a particular subject in the stacks, but also as a guide to what subjects "exist" in the library's own ontology and how more specialized topics are related to or derived from the more general subject headings. Metadata is frequently stored in a central location and used to help organizations standardize their data. This information may be stored in a metadata registry.

Usually it may be difficult to distinguish between (raw) data and metadata because something can be data and metadata at the same time (e.g. the headline of an article may both its title—metadata—and part of its text—data. Furthermore, data and metadata may exchange their roles. A poem, as such, may be regarded as data, but if there is a song that used the poem as lyrics, the whole poem may be attached to an audio file of the song as metadata. Thus, the labeling depends on the point of view.

Metadata has many different applications. For example, metadata may be used to speed up and enrich searching for resources. In general, search queries using metadata can save users from performing more complex filter operations manually. It is now common for web browsers, P2P applications and media management software to automatically download and locally cache metadata, to improve the speed at which files can be accessed and searched.

As shown in FIG. 1, a document 102 may include text, images, and other embedded objects such as audio files, video files, and the like. Metadata 104 associated with the document 102 may include general properties associated with the entire document such as the name of the author, an expiration date, a version of the document, and the like. Metadata 104 may also include specific metadata associated with sections of the document (sometimes called tags) such as semantic labels associated with specific strings of text, properties associated with embedded objects, and the like.

Figure 2:
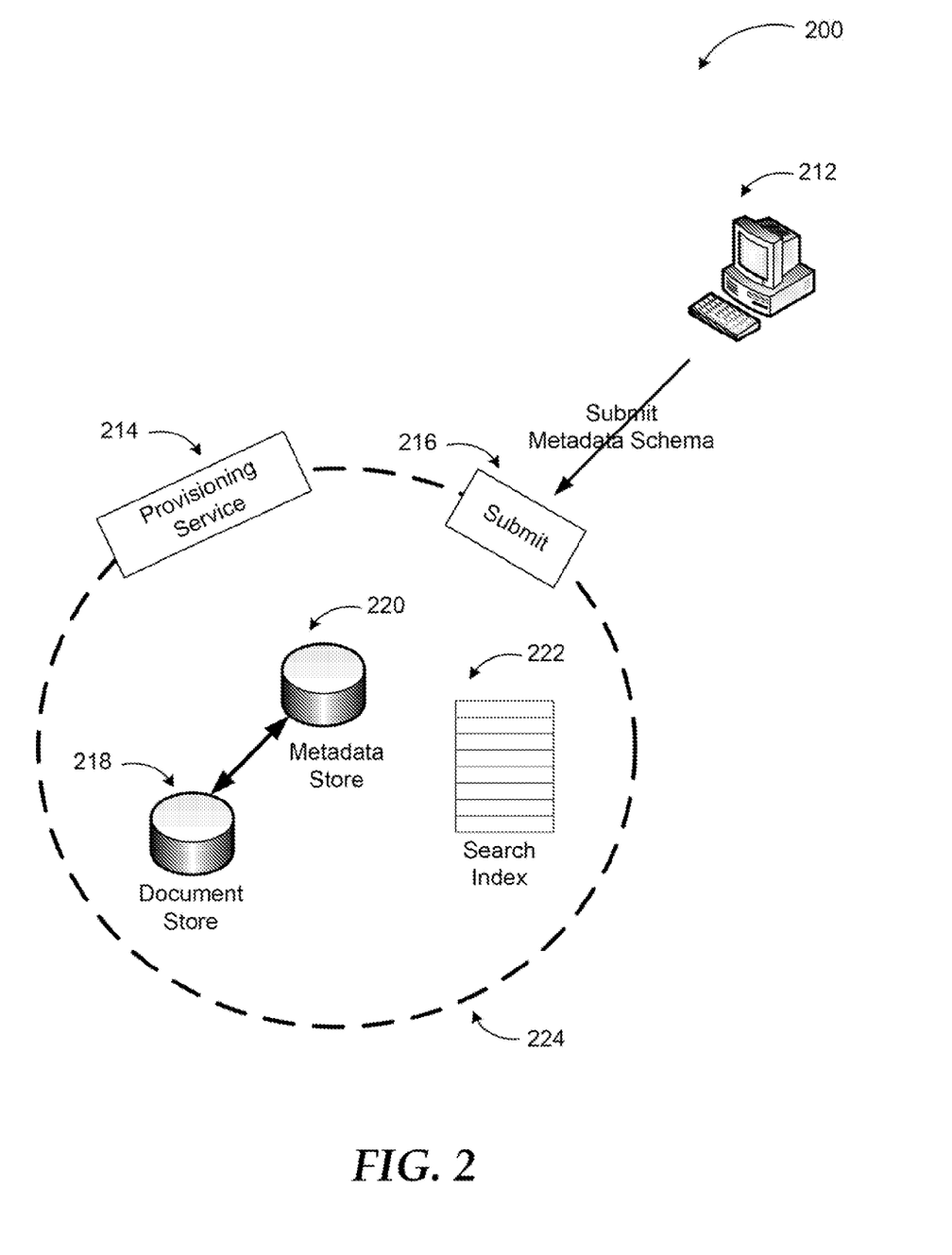
FIG. 2 illustrates an example service platform with search capability for documents with differing metadata schemata according to embodiments.

FIG. 2 illustrates an example service platform with search capability for documents with differing metadata schemata according to embodiments. Service platforms may take many forms and configurations. Typically, a service platform is associated with multiple customers, whose clients are served through the platform based on the parameters and content provided be each customer. For example, a product support service for a computer products provider may provide support documents (and/or online help services) for a variety of products and components that may be part of the systems sold by the provider. These products and components may include hardware and software from various vendors and may involve licensing and similar permission issues. Thus, a service platform designed to provide a uniform support experience to the users of the product support service may receive documents from many sources utilizing various types of metadata. The documents may include metadata that conforms to a core schema, but each may also include metadata that has its own custom schema. Therefore, the service platform may have to deal with the differing metadata schemata of the documents when performing a search and filtering results for a user.

Example service platform 224 includes document store 218 and metadata store 220 for storing documents and their metadata submitted by customers (e.g. customer 212) through the submit module 216. Search index 222 may be generated to perform efficient searches on the stored documents and metadata employing filtering techniques. Provisioning service 214 may manage provisioning of schemata among various metadata types submitted by different clients.

According to one embodiment, customers (e.g. customer 212) define the metadata schema to be used by the documents before submitting documents to service platform 224. When these schemata are submitted through provisioning service 214, the sen-ice platform may assign a unique identifier (sid) to each schema. Documents may be submitted through submit service 216. The service may then prefix this unique identifier to the name of each property in the schema to create a new, namespace decorated name (sid.name) which may be guaranteed to be unique across all schemata submitted to service platform 224. A property with this decorated name may then be created in the search index schema (222). This "decorated property" may be used for filtering queries.

When documents are submitted to service platform 224, they specify which metadata schema they use. Thus, the service platform can convert the property names to the decorated version used in the index schema when the documents are indexed. Documents may be submitted multiple times, with different schemata. This enables the same document to be shared by multiple customers. Service platform 224 may track which schemata a document is associated with using a multi-valued metadata property to hold a list of schema names. At query time, the customer may specify that they wish to search over documents belonging to only one schema, or to documents belonging to any of a set of schemata.

However, filtering over a multi-valued property is resource-expensive. Therefore, service platform 224 may perform filtering using a set of single-valued properties by first automatically creating a single-valued decorated property in the search index (e.g. with the name sid.IsPartOfSchema) for each schema that is submitted to the service platform. Whenever a document is submitted associated with that schema, the value of that property may be set to "true". By using multiple single-valued properties whose names indicate which schema the document belongs to, service platform 224 can avoid using the multi-valued property in filtering.

At query time, service platform 224 may convert the requested set of document schemas into a filter over the properties of joint tables containing documents of all schemas. For documents that belong to other schema, the core or common properties may be set to null, such that they do not surface. Similarly, to perform property based filtering, when an asset is published to some schemas, but not other schemas, the properties specific to the schemas that this asset is not published to may be treated as null. Thus, a single schema search index may be used for performing the search and filtering on documents with varying schemata.

A system according to embodiments is not limited to the example system and its components described above. Searching documents with differing metadata schemata may be implemented with fewer or additional components performing additional or fewer tasks using the principles described herein.

Figure 3:
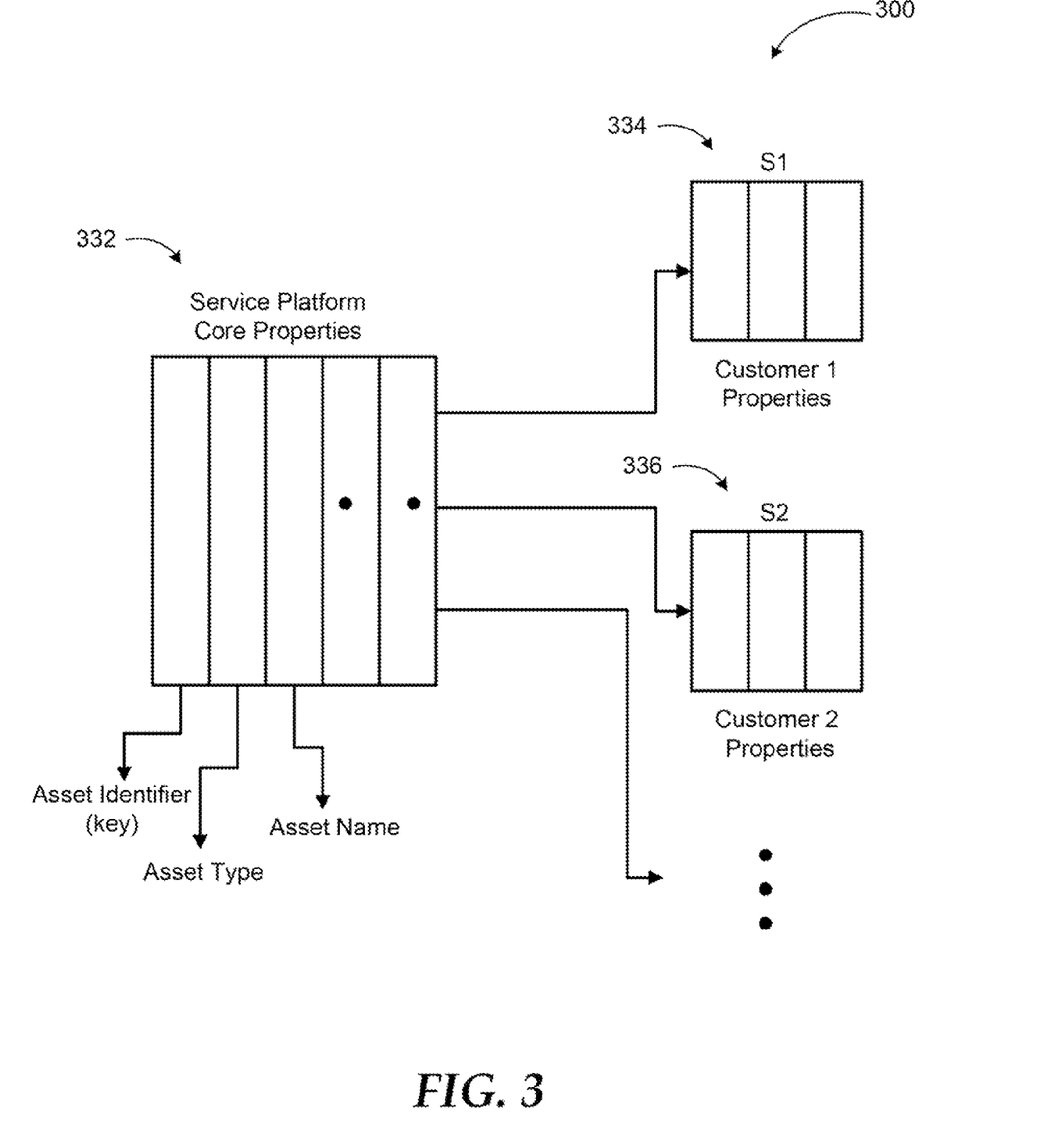
FIG 3 illustrates an example metadata schema of a service platform's core properties associated with differing metadata schemata from individual customer before the properties are converted to a single schema index.

FIG. 3 illustrates an example metadata schema of a service platform's core properties associated with differing metadata schemata from individual customer before the properties are converted to a single schema index.

As described above, according to embodiments, documents include a specification of which metadata schema they use when submitted to a service platform. The service platform can then convert the property names to the decorated version used in the index schema when the documents are indexed.

At query time, the customer may specify that they wish to search over documents belonging to only one schema, or to documents belonging to any of a set of schemata. Documents may share some of the properties conforming the service platforms core properties schema 332. The common properties may include an identifier (asset identifier), a type (asset type), a name (asset name), and other common properties.

In addition to the core properties, each document may include custom properties according to the customer's own schema (e.g. schema S1 334, S2 336, and so on). While some of these schemata may be shared by a portion of the customers, they may also each be unique to the individual customers. Any combination of commonality between metadata schemata may be encountered.

A single-valued decorated property may be created in the search index (sid.IsPartOfSchema) for each schema that is submitted to the service platform. For each document submitted to the platform that is associated with the particular schema, the value of that property may be set to "true". This way, multiple single-valued properties with names indicating which schema they belong to may be employed in place of multi-valued properties for filtering.

Following the same example, the service platform may convert the requested set of document schemas (documents in s1 and s2) into a filter over the properties sid1.IsPartOfSchema and sid2.isPartOfSchema of joint tables containing documents of all schemas, such as (sid1.IsPartOfSchema=1 or sid2.IsPartOfSchema=1) at query time. For a document associated with another schema, such as s1, the names may be set as sid3.IsPartOfSchema=1 but sid1.IsPartOfSchema=null and sid2.IsPartOfSchema=null. Thus, the first two are filtered out automatically.

For property based filtering, when an asset is published to some schemas, but not to other schemas, the properties specific to the schemas that this asset is not published to may be treated as null. For example. Asset A1 may be published to S1 and S2, but not S4 and S4 may have a specific property S4.P1. Then, A1's S4.P1 property would be considered as null.

While specific property indexing and filtering techniques are used and described, a system according to embodiments is not limited to the definitions and examples described above. Performing a document search in a service platform with non-uniform metadata schemata may be provided using additional or fewer steps and techniques.

Figure 4:
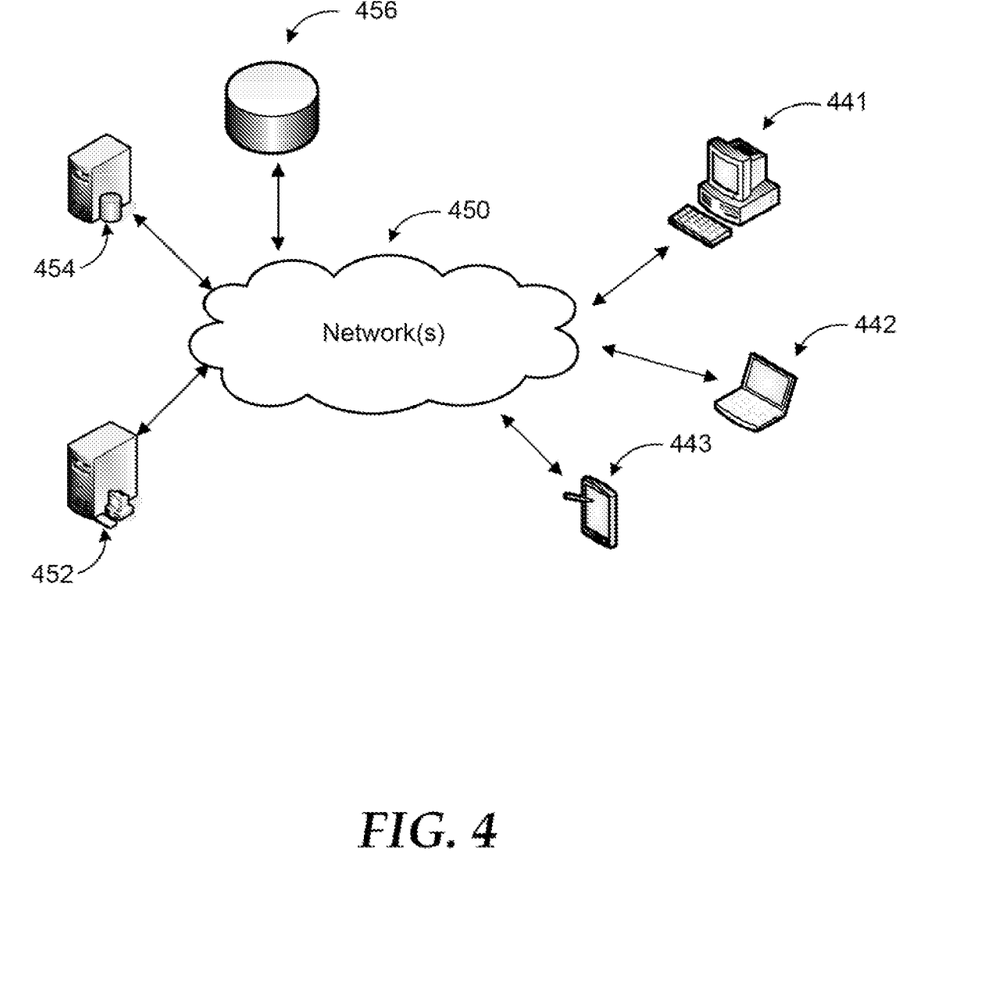
FIG. 4 is an example networked environment, where embodiments may be implemented.

FIG. 4 is an example networked environment, where embodiments may be implemented. Document search systems may be implemented locally on a single computing device or in a distributed manner over a number of physical and virtual clients and servers. They may also be implemented in un-clustered systems or clustered systems employing a number of nodes communicating over one or more networks (e.g. network(s) 450).

Such a system may comprise any topology of servers, clients, Internet service providers, and communication media. Also, the system may have a static or dynamic topology. The term "client" may refer to a client application or a client device. While a networked system implementing a document search system for document sets with differing metadata schemata may involve many more components, relevant ones are discussed in conjunction with this figure.

A document search engine capable of searching document with differing metadata schemata according to embodiments may be implemented as part of a service platform in individual client devices 441-443 or executed in server 452 and accessed from anyone of the client devices (or applications). Data stores associated with searchable documents and their metadata may be embodied in a single data store such as data store 456 or distributed over a number of data stores associated with individual client devices, servers, and the like. Dedicated database servers (e.g. database server 454) may be used to coordinate data retrieval and storage in one or more of such data stores.

Network(s) 450 may include a secure network such as an enterprise network, an unsecure network such as a wireless open network, or the Internet. Network(s) 450 provide communication between the nodes described herein. By way of example, and not limitation, network(s) 450 may include wired media such as a wired network or direct-wired connection, and wireless media such as acoustic, RF, infrared and other wireless media.

Many other configurations of computing devices, applications, data sources, data distribution systems may be employed to implement document searching in an environment with various metadata schemata. Furthermore, the networked environments discussed in FIG. 4 are for illustration purposes only. Embodiments are not limited to the example applications, modules, or processes.

Figure 5:
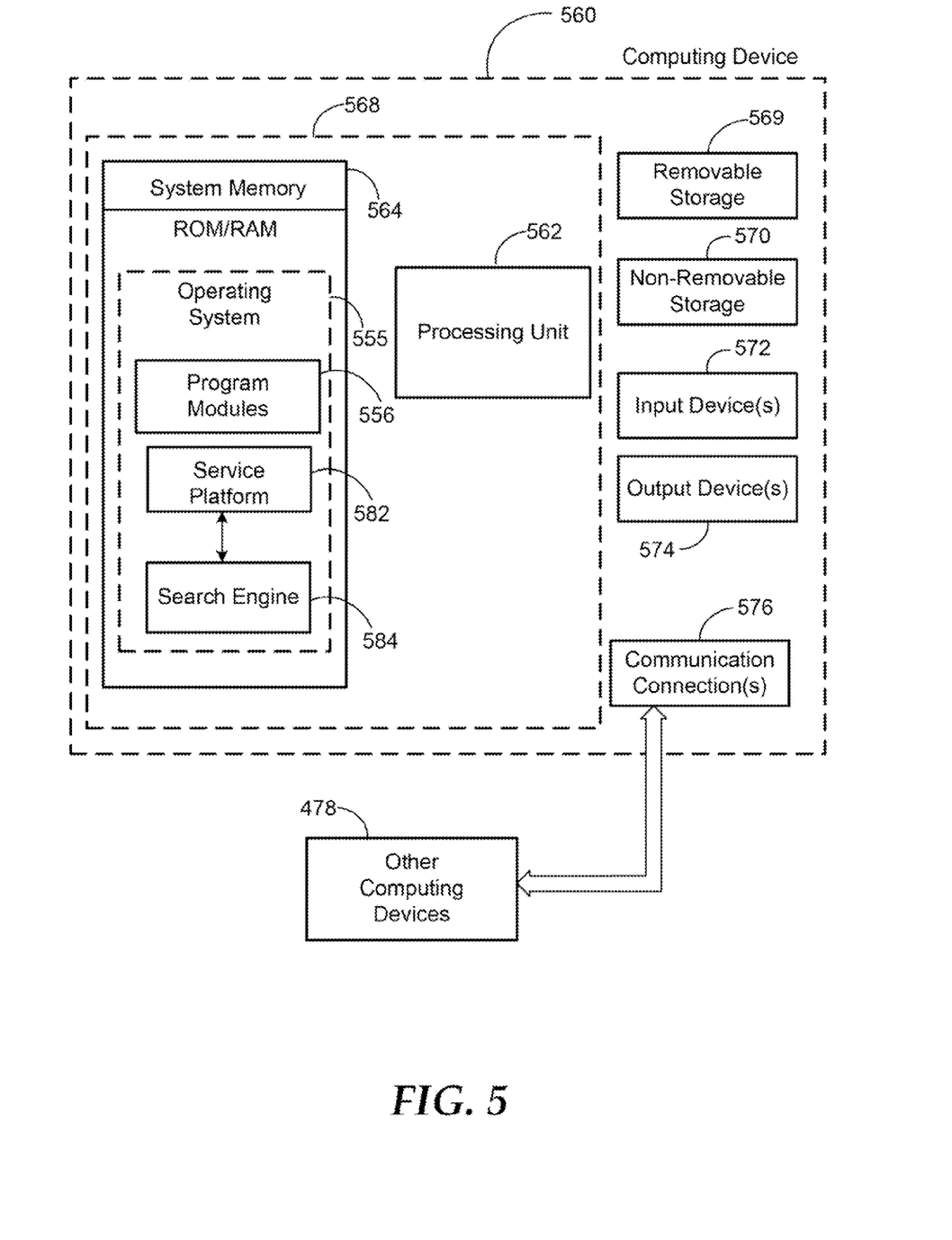
FIG. 5 is a block diagram of an example computing operating environment, where embodiments may be implemented.

FIG. 5 and the associated discussion are intended to provide a brief general description of a suitable computing environment in which embodiments may be implemented. With reference to FIG. 5, a block diagram of an example computing operating environment is illustrated, such as computing device 560. In a basic configuration, the computing device 560 may be a server providing document search service and typically include at least one processing unit 562 and system memory 564. Computing device 560 may also include a plurality of processing units that cooperate in executing programs. Depending on the exact configuration and type of computing device, the system memory 564 may be volatile (such as RAM), non-volatile (such as ROM, flash memory, etc.) or some combination of the two. System memory 564 typically includes an operating system 565 suitable for controlling the operation of a networked personal computer, such as the WINDOWS® operating systems from MICROSOFT CORPORATION of Redmond, Wash. The system memory 564 may also include one or more software applications such as program modules 566, service platform 582, and search engine 584.

Service platform 582 may be an individual application or a cluster of interacting applications that provides a variety of services to clients associated with computing device 560. Search engine 586 may perform document searches and filtering on document sets with differing metadata schemata, as described previously. This basic configuration is illustrated in FIG. 5 by those components within dashed line 568.

The computing device 560 may have additional features or functionality. For example, the computing device 560 may also include additional data storage devices (removable and/or non-removable) such as, for example, magnetic disks, optical disks, or tape. Such additional storage is illustrated in FIG. 5 by removable storage 569 and non-removable storage 570. Computer storage media may include volatile and non-volatile, removable and non-removable media implemented in any method or technology for storage of information, such as computer readable instructions, data structures, program modules, or other data. System memory 564, removable storage 569 and non-removable storage 570 are all examples of computer storage media. Computer storage media includes, but is not limited to, RAM, ROM, EEPROM, flash memory or other memory technology, CD-ROM, digital versatile disks (DVD) or other optical storage, magnetic cassettes, magnetic tape, magnetic disk storage or other magnetic storage devices, or any other medium which can be used to store the desired information and which can be accessed by computing device 560. Any such computer storage media may be part of device 560. Computing device 560 may also have input device(s) 572 such as keyboard, mouse, pen, voice input device, touch input device, etc. Output device(s) 574 such as a display, speakers, printer, etc. may also be included. These devices are well known in the art and need not be discussed at length here.

The computing device 560 may also contain communication connections 576 that allow the device to communicate with other computing devices 578, such as over a wireless network in a distributed computing environment, for example, an intranet or the Internet. Other computing devices 578 may include server(s) that provide access to document stores, user information, metadata, and so on. Communication connection 576 is one example of communication media. Communication media may typically be embodied by computer readable instructions, data structures, program modules, or other data in a modulated data signal, such as a carrier wave or other transport mechanism, and includes any information delivery media. The term "modulated data signal" means a signal that has one or more of its characteristics set or changed in such a manner as to encode information in the signal. By way of example, and not limitation, communication media includes wired media such as a wired network or direct-wired connection, and wireless media such as acoustic, RF, infrared and other wireless media. The term computer readable media as used herein includes both storage media and communication media.

The claimed subject matter also includes methods. These methods can be implemented in any number of ways, including the structures described in this document. One such way is by machine operations, of devices of the type described in this document.

Another optional way is for one or more of the individual operations of the methods to be performed in conjunction with one or more human operators performing some. These human operators need not be collocated with each other, but each can be only with a machine that performs a portion of the program.

Figure 6:
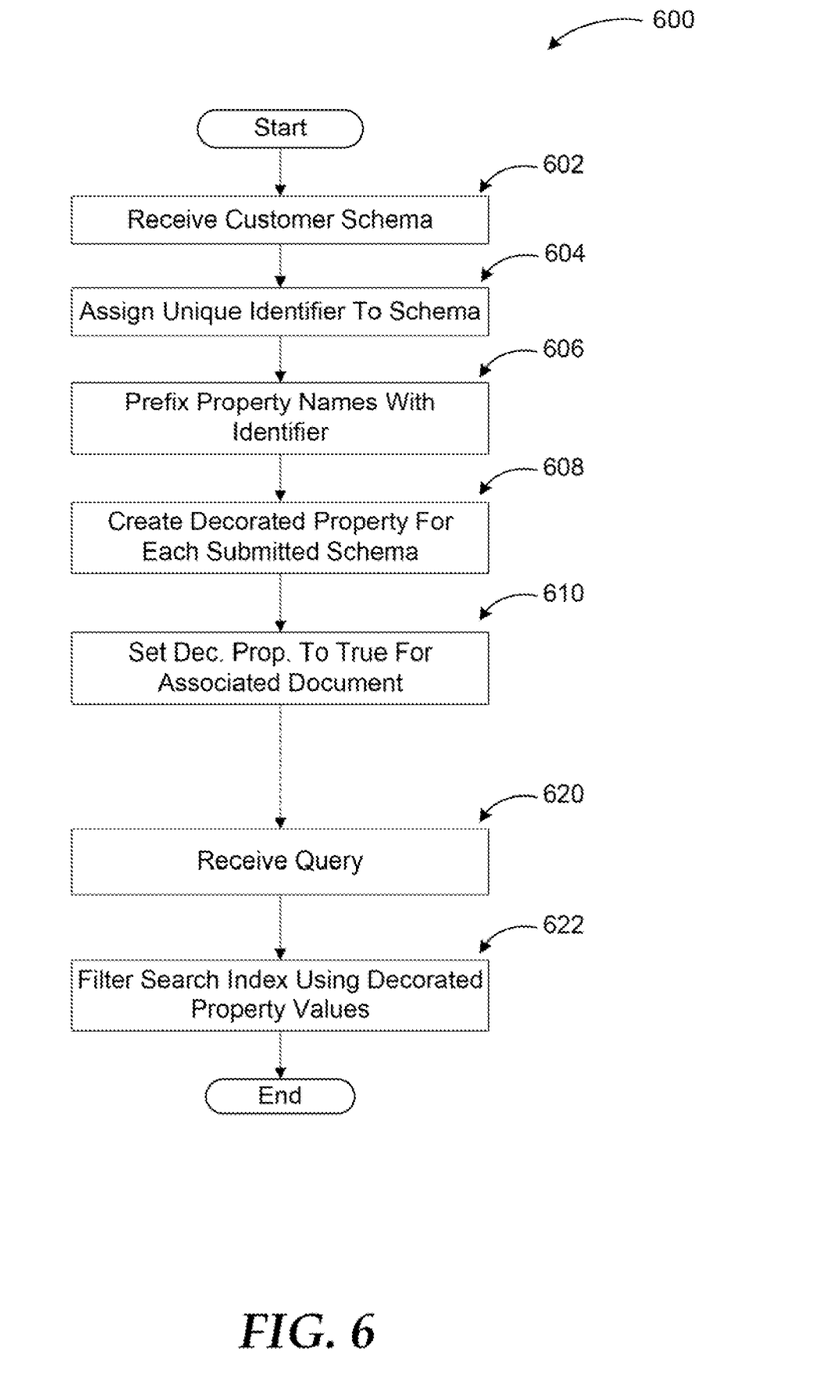
FIG. 6 illustrates a logic flow diagram of a document search process based on documents with differing metadata schemata according to embodiments.

FIG. 6 illustrates a logic flow diagram of a document search process 600 based on documents with differing metadata schemata according to embodiments. Process 600 may be implemented as part of a document search service.

Process 600 begins with operation 602, where a customer defined metadata schema is received. Processing advances from operation 602 to operation 604.

At operation 604, a unique identifier is assigned to the schema by the service platform. Processing continues to operation 606 from operation 604.

At operation 606, the unique identifier is prefixed to the name of each property in the schema to create a new, namespace decorated name such that each decorated name is ensured to be unique across all schemata submitted to the service platform. Processing moves to operation 608 from operation 606.

At operation 608, a single-valued decorated property is created in the search index for each submitted schema that indicates whether a document that includes this property is part of the schema or not. In other embodiments, a multi-valued property may also be utilized. Processing moves to operation 610 from operation 608.

At operation 610, the single-valued decorated property is set to "true" for each document submitted by the customer that is associated with the schema submitted in operation 602. Operation 610 completes a first portion of the process of using single-valued decorated properties for searching documents with differing metadata schemata. A second portion of the process which is loosely coupled to the first portion as indicated by the dashed line in FIG. 6, begins at operation 620 following operation 610.

At operation 620, a query request is received by the platform that necessitates search of document sets previously associated with submitted metadata schemata as described above. Processing advances from operation 620 to operation 622.

At operation 622, the requested set of document schemata are converted into a filter over the properties of joint tables containing documents of all schemata. Because the decorated single-valued property indicating document-schema association indicates whether a document is using a particular schema or not, documents of other schemata can easily be eliminated from the search list. After operation 622, processing moves to a calling process for further actions.

The operations included in process 600 are for illustration purposes. Document search in a service platform on documents with differing metadata schemata may be implemented by similar processes with fewer or additional steps, as well as in different order of operations using the principles described herein.

The above specification, examples and data provide a complete description of the manufacture and use of the composition of the embodiments. Although the subject matter has been described in language specific to structural features and/or methodological acts, it is to be understood that the subject matter defined in the appended claims is not necessarily limited to the specific features or acts described above. Rather, the specific features and acts described above are disclosed as example forms of implementing the claims and embodiments.

What is claimed is:

1. A method to be executed at least in part in a computing device for searching documents with differing metadata schemata, the method comprising:

receiving a document associated with the differing metadata schemata, the differing metadata schemata comprising at least first metadata conforming to a core schema and a second metadata having a custom schema, the custom schema comprising a customer defined metadata schema;

assigning a unique identifier to each of the core schema and the customer defined metadata schema for the received document;

prefixing each of the assigned unique identifiers to a name associated with at least one property in the core schema and at least one property in the customer defined metadata schema to create a new and unique namespace decorated name;

automatically creating an association property comprising a single-valued property in a search index for each of the core schema and the customer defined metadata schema, wherein a plurality of single-valued properties are utilized to perform filtering, wherein a name of each of the plurality of single-valued properties indicates which schema the received document belongs to;

storing the created association property in the search index; receiving a request for a search query, the received request specifying a search over documents belonging to a set of metadata schemata, the set of metadata schemata including the core schema and the customer defined metadata schema, wherein the request is received from a user associated with the customer defined metadata schema; in response to receiving the request for the search query, converting the set of metadata schemata into a filter over properties of joint tables containing documents belonging to a plurality of metadata schemata; and performing the search over the documents belonging to the plurality of metadata schemata using the search index by filtering the documents based on their association properties, wherein filtering the documents comprises eliminating documents which the single-valued property does not indicate as being associated with the customer defined metadata schema.

2. The method of claim 1, further comprising, in response to receiving the document, modifying the association property to indicate that the document is associated with the core schema and the custom schema, wherein modifying the association property includes setting a value of the association property to "true" for the document associated with the core schema and the custom schema.

3. The method of claim 1, further comprising:
registering the customer defined metadata schema.

4. A system for searching documents with differing metadata schemata, the system comprising:
a memory;
a processor coupled to the memory, wherein the processor is configured to: receive a document associated with the differing metadata schemata, the differing metadata schemata comprising at least first metadata conforming to a core schema and a second metadata having a custom schema, the custom schema comprising a customer defined metadata schema;
assign a unique identifier to each of the core schema and the customer defined metadata schema for the received document;
prefix each of the assigned unique identifiers to a name associated with at least one property in the core schema and at least one property in the customer defined metadata schema to create a new and unique namespace decorated name;
automatically create an association property comprising a single-valued property in a search index for each of the core schema and the customer defined metadata schema, wherein a plurality of single-valued properties are utilized to perform filtering, wherein a name of each of the plurality of single-valued properties indicates which schema the received document belongs to;
store the created association property in the search index;
receive a request for a search query, the received request specifying a search over documents belonging to a set of metadata schemata, the set of metadata schemata including the core schema and the customer defined metadata schema;
in response to receiving the request for the search query from a user associated with the customer defined metadata schema, convert the set of metadata schemata into a filter over properties of joint tables containing documents belonging to a plurality of metadata schemata; and
perform the search over the documents belonging to the plurality of metadata schemata using the search index by filtering the documents based on their association properties, wherein filtering the documents comprises eliminating documents which the single-valued property does not indicate as being associated with the customer defined metadata schema; and
provide results of the search to the user.

5. The system of claim 4, wherein the processor is further configured to modify names of all properties associated with the received document to include the unique identifiers.

6. The system of claim 4, further comprising:
a metadata store for storing the differing metadata schemata; and
a document store for storing documents received from customers.

7. A computer-readable storage medium with instructions encoded thereon for searching documents with differing metadata schemata, the encoded instructions executed by a processor to perform steps comprising:
receiving a document associated with the differing metadata schemata, the differing metadata schemata comprising at least first metadata conforming to a core schema and a second metadata having a custom schema, the custom schema comprising a customer defined metadata schema;
assigning a unique identifier to each of the core schema and the customer defined metadata schema for the received document;
prefixing each of the assigned unique identifiers to a name associated with at least one property in the core schema and at least one property in the customer defined metadata schema to create a new and unique namespace decorated name;
automatically creating a single-valued association property in a search index for each of the core schema and the customer defined metadata schema, wherein a plurality of single-valued association properties are utilized to perform filtering, wherein a name of each of the plurality of single-valued association properties indicates which schema the received document belongs to;
storing the created single-valued association property in the search index along with core properties for the document associated with the search index;
receiving a request for a search query, the received request specifying a search over documents belonging to a set of metadata schemata, the set of metadata schemata including the core schema and the customer defined metadata schema;
in response to receiving the request for the search query, converting the set of metadata schemata into a filter over properties of joint tables containing documents belonging to a plurality of metadata schemata; and
performing the search over the documents belonging to the plurality of metadata schemata using the search index by filtering the documents based on their created single-valued association properties, wherein filtering the documents comprises eliminating documents which the created single-valued association property does not indicate as being associated with the customer defined metadata schema.

8. The computer-readable storage medium of claim 7, wherein a value of the created single-valued association property is set to "true" for a document associated with the core schema and the custom schema and to "false" for a document not associated with the core schema and the custom schema.

9. The computer-readable storage medium of claim 8, wherein filtering the documents includes eliminating documents with the created single-valued association property values of "false" from the search over the documents belonging to the plurality of metadata schemata.

* * * * *